US009043486B2

(12) United States Patent
Bailey (10) Patent No.: US 9,043,486 B2
(45) Date of Patent: May 26, 2015

(54) DATA TRANSFER METHOD, SYSTEM AND PROTOCOL

(75) Inventor: Christopher Paul Bailey, Ottawa (CA)

(73) Assignee: UNLIMI-TECH SOFTWARE INC., Ottawa, Ontario (CA)

(*) Notice: Subject to any disclaimer, the term of this patent is extended or adjusted under 35 U.S.C. 154(b) by 849 days.

(21) Appl. No.: 12/510,413

(22) Filed: Jul. 28, 2009

(65) Prior Publication Data

US 2009/0287844 A1 Nov. 19, 2009

Related U.S. Application Data

(63) Continuation of application No. PCT/CA2008/000153, filed on Jan. 24, 2008.

(30) Foreign Application Priority Data

Jan. 31, 2007 (CA) ..................................... 2577030

(51) Int. Cl.
| | |
|---|---|
| *G06F 15/167* | (2006.01) |
| *G06F 15/16* | (2006.01) |
| *H04L 29/08* | (2006.01) |
| *H04L 1/18* | (2006.01) |

(52) U.S. Cl.
CPC ............. *H04L 69/326* (2013.01); *H04L 1/1867* (2013.01)

(58) Field of Classification Search
CPC ............ H04L 29/08477; H04L 67/108; H04L 29/06122; H04L 69/326; H04L 1/1867
USPC ................................................. 709/213, 236
See application file for complete search history.

(56) References Cited

U.S. PATENT DOCUMENTS

| | | | | |
|---|---|---|---|---|
| 5,572,678 | A * | 11/1996 | Homma et al. ............... | 709/227 |
| 6,381,215 | B1 | 4/2002 | Hamilton et al. | |
| 6,445,717 | B1 * | 9/2002 | Gibson et al. ................. | 370/473 |
| 7,515,612 | B1 * | 4/2009 | Thompson .................... | 370/474 |
| 7,711,844 | B2 * | 5/2010 | Schuehler et al. ............ | 709/238 |
| 2002/0080802 | A1 * | 6/2002 | Sachs et al. .................... | 370/401 |
| 2002/0133491 | A1 * | 9/2002 | Sim et al. ......................... | 707/10 |
| 2003/0088667 | A1 * | 5/2003 | Riedle ............................ | 709/224 |
| 2004/0064578 | A1 * | 4/2004 | Boucher et al. ............... | 709/236 |
| 2004/0148425 | A1 * | 7/2004 | Haumont et al. .............. | 709/236 |
| 2005/0036511 | A1 | 2/2005 | Baratakke et al. | |
| 2005/0182842 | A1 * | 8/2005 | Walsh et al. ................... | 709/230 |
| 2006/0031537 | A1 * | 2/2006 | Boutboul et al. .............. | 709/228 |
| 2006/0242153 | A1 * | 10/2006 | Newberry et al. ............... | 707/10 |
| 2007/0288484 | A1 * | 12/2007 | Yan et al. ......................... | 707/10 |
| 2009/0172157 | A1 * | 7/2009 | Zhang ............................ | 709/224 |

FOREIGN PATENT DOCUMENTS

| | | | |
|---|---|---|---|
| EP | 0969623 B1 | 5/2006 | |
| WO | WO 01/54370 A2 * | 7/2001 | .............. H04L 26/06 |

OTHER PUBLICATIONS

International Search Report for the corresponding International Application No. PCT/CA2008/000153; date of completion Apr. 15, 2008.

* cited by examiner

Primary Examiner — Douglas Blair
(74) Attorney, Agent, or Firm — Myers Wolin, LLC (57) ABSTRACT

A method for transmitting blocks of data in data packets from a first device on a network to a second device on the network comprising the steps of, providing a File Transmitter Application in communication with the first device, which File Transmitter Application is adapted to control the transmission of the blocks of data in data packets on the network, including the timing of the commencement of the transmission of the data blocks on the network, providing a File Receiver Application in communication with the second device and in communication with the File Transmitter Application, which File Receiver Application is adapted to transmit Acknowledgment data to the File Transmitter Application relating to the receipt of data blocks received at the second device, commencing the transmission of a first data block from the first device to the second device, by way of the network and commencing the transmission of the second data block from the first device to the second device, by way of the network.

8 Claims, 4 Drawing Sheets

Figure. 1

Pseudo code for Transmitter Controller Thread

```
Set BID = 0
While there is still data remaining in the file {
    If we have not exceeded maximum number of block senders {
        Read block of size BS from file
        Create/start a Block Sender Thread and pass block of data and BID to
        it
        Increment BID
        Wait for the amount of time it would take to send one block of data at
        the given transmission rate
    } else {
        wait until we are not at the maximum senders
    }
}
Wait for all currently executing Block Sender threads to complete
Close local file and release resources
Terminate thread
```

Pseudo code for Block Sender Thread

Upon creation of this thread, the block of raw data, and the block ID must be supplied. The destination IP and port must also be supplied as well as the FID for this transfer.

```
Set PID = 0
While there is more data within the block {
    Read PS bytes from the block, known as PAYLOAD
    Create a UDP packet consisting of
        | TID | FID | BID | BS | PID | PS | PAYLOAD
    Send the UDP packet to destination IP address and Port
    Increment the PID value
}

Send packets to receiver to notify it should either 1) send a confirmation of a
complete block, or 2) send a list of missing packet indexes for this block While this block has missing packets, and has not been acknowledged {
    Go to sleep for one RTT
    If there are missing packets for this block, and block is not complete {
        For each missingID 1 - N {
            Read PS bytes from the block at given missing index
            Create a UDP packet consisting of
                | TID | FID | BID | BS | PID | PS | PAYLOAD
            Send the UDP packet to destination IP address and Port
        }
    }
    Send packets to receiver to notify it should either 1) send a
    confirmation of a complete block, or 2) send a list of missing packet
    indexes for this block
}

Block has been completed at this point, exit this thread and clean-up
resources
```

Pseudo code for Receiver Thread

```
While we have not received entire file {

Receive a UDP packet
    Extract TID, FID, BS, BID, PS, PID, and PAYLOAD

If this packet belongs to current file (FID is correct) {
        If TID means request for missing packets {
            Iterate through block and send missing packets list
        }
        else if this is a data packet and BID is not already complete {
            If (BID has not yet been seen) {
                Allocate memory for this block
            }

Insert PAYLOAD into proper index within block

If block is complete {
                Send acknowledgement for this block
                Write this block to disk
                De-allocate memory or resources for this block
            }
        }
    }
}
```

DATA TRANSFER METHOD, SYSTEM AND PROTOCOL

CROSS REFERENCE TO RELATED APPLICATIONS

The present disclosure is a continuation application under 35 U.S.C. §111(a) of International Patent Application No. PCT/CA2008/000153 filed on Jan. 24, 2008, which claims priority to Canadian Patent Application No. 2,577,030 filed on Jan. 31, 2007, the disclosures of which are expressly incorporated herein by reference in its entireties.

FIELD OF THE INVENTION

The present invention relates to data transfer protocols, and more particularly relates to data transfer protocols that improve data flow through a network or the Internet.

BACKGROUND OF THE INVENTION

In the context of many networks, and the Internet, it has become commonplace to transfer data utilizing one or more data packets (at the time of transmission of the data, the data is transformed into one or more data packets for transmission on the network or Internet, the packets generally containing 3 main parts, namely, the header, the payload and the trailer). With the proliferation of the Internet, the Transmission Control Protocol (hereinafter and generally referred to as "TCP") has become the most widely used networking protocol for the transmission of data packets on the Internet. It is generally understood that TCP ensures that no packets are lost during transmissions by giving each transmitted packet a sequence number, which sequence number is used to make sure that the packets are delivered in the correct order at the receiving end. The TCP module at the receiving end acknowledges the receipt of each packet received and in the event that an acknowledgment is not received by the sender within a reasonable round-trip time (hereinafter "RTT"), the sender's timer will timeout and any lost data packets will then be re-transmitted. In this way, TCP generally provides reliable data transmission. However, these re-transmissions reduce the achievable throughput on any given network system.

In circumstances where the network or Internet transmission has a high RTT (for example where the transmission is over a lengthy distance) or has a high packet loss potential (for example where the transmission is over an earth to satellite link, or is being broadcast or sent by radio or microwave transmission), the need to retransmit packets by way of the TCP significantly lengthens the overall transmission time for a given data transfer.

Furthermore, TCP responds to latency and the resulting round-trip delay between the transmitter and receiver, by reducing the data transmission rate, and thus reducing the achievable data throughput.

An alternative data transfer protocol User Datagram Protocol (hereinafter "UDP") may be utilized to transfer data across a network or the Internet. In some circumstances, UDP provides extra performance over TCP, for example, as it does not require the sender and receiver to establish a connection before data is transmitted, it does not require acknowledgment and retransmissions of lost packets, and allows the UDP packets to be received in an order that is different from the one in which they were sent. As will be appreciated, this may result in reduced reliability of the data transmission.

It is therefore desirable to have a high speed, high reliability data transfer protocol that works well in circumstances where the network has a high round trip time, and with high packet loss characteristics. It is also desirable to have a reliable data transfer protocol that provides access to a larger portion of the available bandwidth, and which automatically adjusts to network conditions. In addition, it is desirable to have the ability to multicast/broadcast to multiple clients so that all files are transferred at the maximum line speed available for each client.

SUMMARY OF THE INVENTION

Accordingly, one object of the present invention is to provide a high speed, high reliability data transfer protocol that works well in circumstances where the network or Internet has a high round trip time, and with high packet loss characteristics.

Another object of the present invention is to reduce the negative effects on a network or the Internet, of network latency and packet loss.

Another object of the present invention is to provide reliability and reduced congestion on a network or the Internet.

Another object of the present invention is to provide a reliable data transfer protocol that provides access to a larger portion of the available bandwidth, and which automatically adjusts to network conditions.

A further object of the present invention is to provide the ability to multicast/broadcast to multiple clients so that all files are transferred at the maximum linespeed available for each client.

According to one aspect of the present invention, there is provided a method for transmitting data from a sending device on a network to a receiving device on the network comprising the steps of creating a first data block and a second data block on the sending device, storing at least some data for transmission in the first data block and at least some data for transmission in the second data block, transmitting by way of the network the first data block from the sending device to the receiving device, transmitting by way of the network the second data block from the sending device to the receiving device, wherein, the transmission of the second data block commences prior to the receipt by the sending device of any confirmation from the receiving device of receipt of the first data block.

BRIEF DESCRIPTION OF THE DRAWINGS

A preferred embodiment of the present invention is described below with reference to the accompanying drawings, in which.

DESCRIPTION OF THE PREFERRED EMBODIMENT

In the preferred embodiment of the present invention a File Transmitter Application and a File Receiver Application are provided as more fully described herein. In the preferred embodiment, portions of the UDP protocol are utilized, it being understood that alternative embodiments of the invention may utilize other file transfer protocols.

Figure 1:
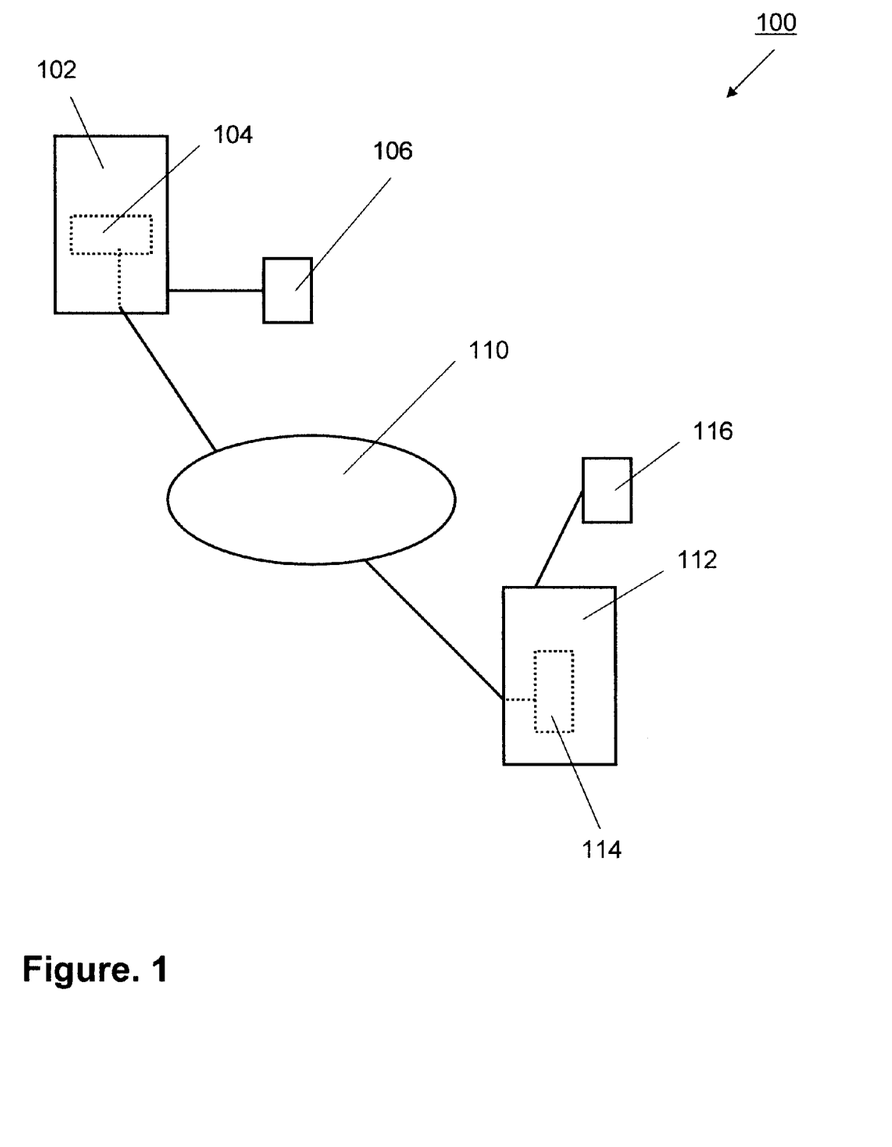
FIG. 1 is a simplified block diagram illustrating a system for implementing the File Transmitter Application according to the preferred embodiment of the present invention.

Referring to FIG. 1, a system 100 for implementing the File Transmitter Application according to the preferred embodiment of the present invention is shown. The File Transmitter Application generally coordinates reading data from the sending device's 102 disk 104 or other accessible data storage device 106 or from a standard input stream, and coordinates the sending of this data over the network 110 or Internet, while the File Receiver Application receives and sorts incoming data from the network 110 or Internet and writes it to a receiver device's 112 disk 114 or other accessible data storage device 116 or to a standard output stream at the destination. The File Transmitter Application In the preferred embodiment, as more fully described herein, the File Transmitter Application reads a first block of data from a sending device's data source, generally a data file, and commences the transmission of this first block, by way of the network or Internet, to the receiver device, the first data block being addressed by the File Transmitter Application with the IP address and port of the receiver device. Immediately upon the completion of the transmission of the first block (and without waiting for any acknowledgment from the receiver device of the receipt of the first block of data), in the event that there is a second block of data for transmission, the File Transmitter Application commences with the transmission of the second block of data. That is, the transmission of the second block of data by the File Transmitter Application will commence and be affected, regardless of whether or not the first block of data was properly and fully received by the receiver device. Similarly, any third and subsequent blocks of data are sent by the File Transmitter Application immediately upon the completion of the transmission of the previous block of data, regardless of whether or not the previous block of data was properly and fully received by the receiver device.

In a preferred embodiment of the present invention, as more fully described herein, missing packet information is transmitted by the File Receiver Application back to the File Transmitter Application, whereupon the File Transmitter Application will resend the missing data packets to the receiver device. Separate threads of execution are utilized by the File Transmitter Application to ensure that an initial transmission of data blocks proceeds prior to and independently of the checking for missing packets and completion of the transmission of any missing packets associated with the blocks.

In a preferred embodiment of the present invention, to control the reading of data from the sender device, the File Transmitter Application utilizes a Transmitter Control Thread, which Transmitter Control Thread controls the reading of new data, starts the transmission of one or more Block Sender Threads (as more fully described herein) and calculates how long a block of data will take to transmit to the receiver device, based on the current transmission rate of the network or Internet, as more fully described herein.

In a preferred embodiment of the present invention, the File Transmitter Application will commence the sending of the first data block, and will commence sending any second data block immediately after the end of the previously calculated length of time required to send the first data block, whether or not the first block has been completely sent by sending device, and whether or not the first block has been completely received by the receiving device. That is, the commencement of the transmission of the second block of data does not wait until there has been an acknowledgment of receipt of the proper transmission of the first data block (or receipt of a request for retransmission from the receiver device). This process is repeated by the File Transmitter Application until the transmission of all blocks of data have been initiated by the File Transmitter Application. Thereafter, once the transmission of all blocks to be transmitted have been initiated, the Transmitter Controller Thread waits for all Block Sender Threads to be complete.

As more fully described herein, the upon receipt of a data block, the File Receiver Application transmits to the File Transmitter Application an acknowledgment of the receipt of the data block.

In the preferred embodiment, in respect of each data block to be transmitted, the Block Sender Thread sequentially reads small pieces of data (hereinafter called the "payload") from the data block, places the payload within a UDP packet along with certain header information, including for example, the packet type, file identification information, block identification information, packet identification information and payload size (and such other information as would be known to a person skilled in the art), which header information and payload within the UDP packet is transmitted over the network or Internet to the File Receiver Application on the receiver device. After the entire block has been sent once, the Block Sender Thread will then send a notification to the File Receiver Application on the receiver device that the first pass is complete and the File Receiver Application on the receiver device will either reply with a list of the missing packets as more fully described herein, or acknowledge that the block has been completely received. In the event that the File Receiver Application on the receiver device transmits to the Block Sender Thread on the sending device a list of the missing packets, the Block Sender Thread will then resend any missing packets reported by the File Receiver Application, and transmit notification to the File Receiver Application that it has sent the missing packets. In the event that the File Receiver Application on the receiver device again determines that there are missing packets from the retransmitted packets, the File Receiver Application will again reply with a list of the still missing packets, this process repeating itself until the File Receiver Application has received all the packets, and has transmitted an acknowledgment that the block has been completely received. The Block Sender Thread will terminate only when an acknowledgment is received by it from the receiver device that the block has been completely received by the File Receiver Application (unless the transfer is otherwise terminated by the application (i.e. canceled), or if the transmission times out). It is understood that more than one Block Sender Threads may be operating at any given time, and in one embodiment of the present invention, three or more Block Sender Threads may be operating at a given time.

In one embodiment of the present invention, the File Transmitter Application may limit the maximum block size, and the maximum number of blocks that can be in transit at one time, to reduce the likelihood that the transmitting system may run out of memory. In this embodiment, once the Transmitter Controller Thread reaches the maximum number of blocks in transit, the Transmitter Controller Thread will wait for one block of data presently in transit to finish before starting the transmission of another block of data. If more than a pre-specified period of time expires before receipt of the block's acknowledgment from the receiver device, the transfer will halt and a timeout error will result.

In a preferred embodiment of the present invention, to optimize the size and the number of blocks to send at any given time, a calculation is performed to theoretically maximize the amount of relevant data that may be sent through the accessible network, namely: the product of (the number of blocks to be sent to any given time) X (the size of the blocks) must be greater than the amount of data that can be transmitted through one round-trip time at the given transmission rate. This calculation will ensure that the accessible network is full of relevant data (a product that is lower than the amount of data that can be transmitted during one round-trip time would result in the transmitter waiting for an acknowledgment for every block and thus not sending any new data, which would result in less than optimal usage of the network or Internet connection).

Figure 2:
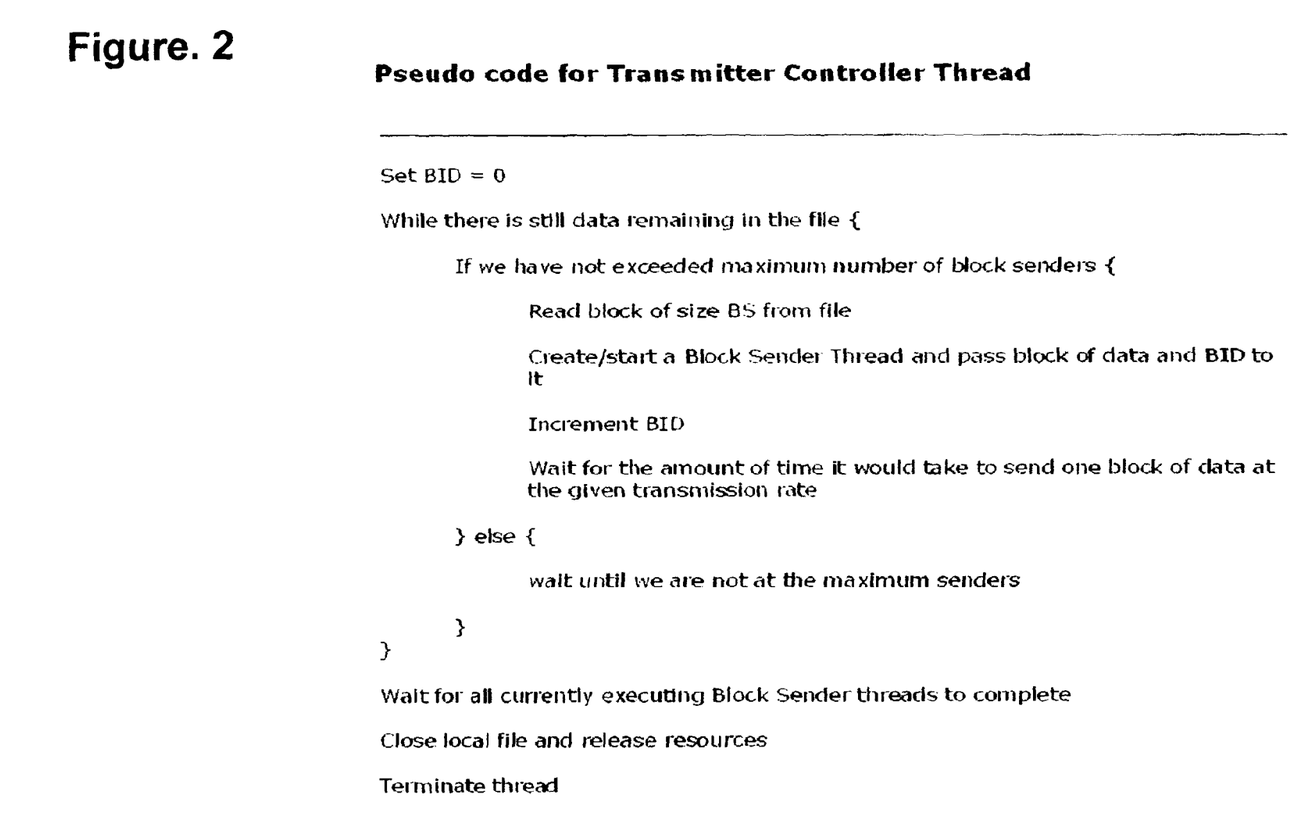
FIG. 2 is sample pseudo-code for the Transmitter Control Thread of one embodiment of the present invention.

FIG. 2 provides sample pseudo-code for an embodiment of the Transmitter Control Thread of the present invention, in which pseudo code, the following acronyms are utilized:
1. BID: block identification number;
2. BS: block size.

The aforementioned Transmitter Control Thread pseudo-code is reproduced in italics below:

```
"Set BID = 0
While there is still data remaining in the file {
    If we have not exceeded maximum number of block senders {
        Read block of size BS from file
        Create/start a Block Sender Thread and pass block of data
            and BID to it
        Increment BID
        Wait for the amount of time it would take to send one block
            of data at the given transmission rate
    } else {
        wait until we are not at the maximum senders
    }
}
Wait for all currently executing Block Sender threads to complete
Close local file and release resources
Terminate thread"
```

Figure 3:
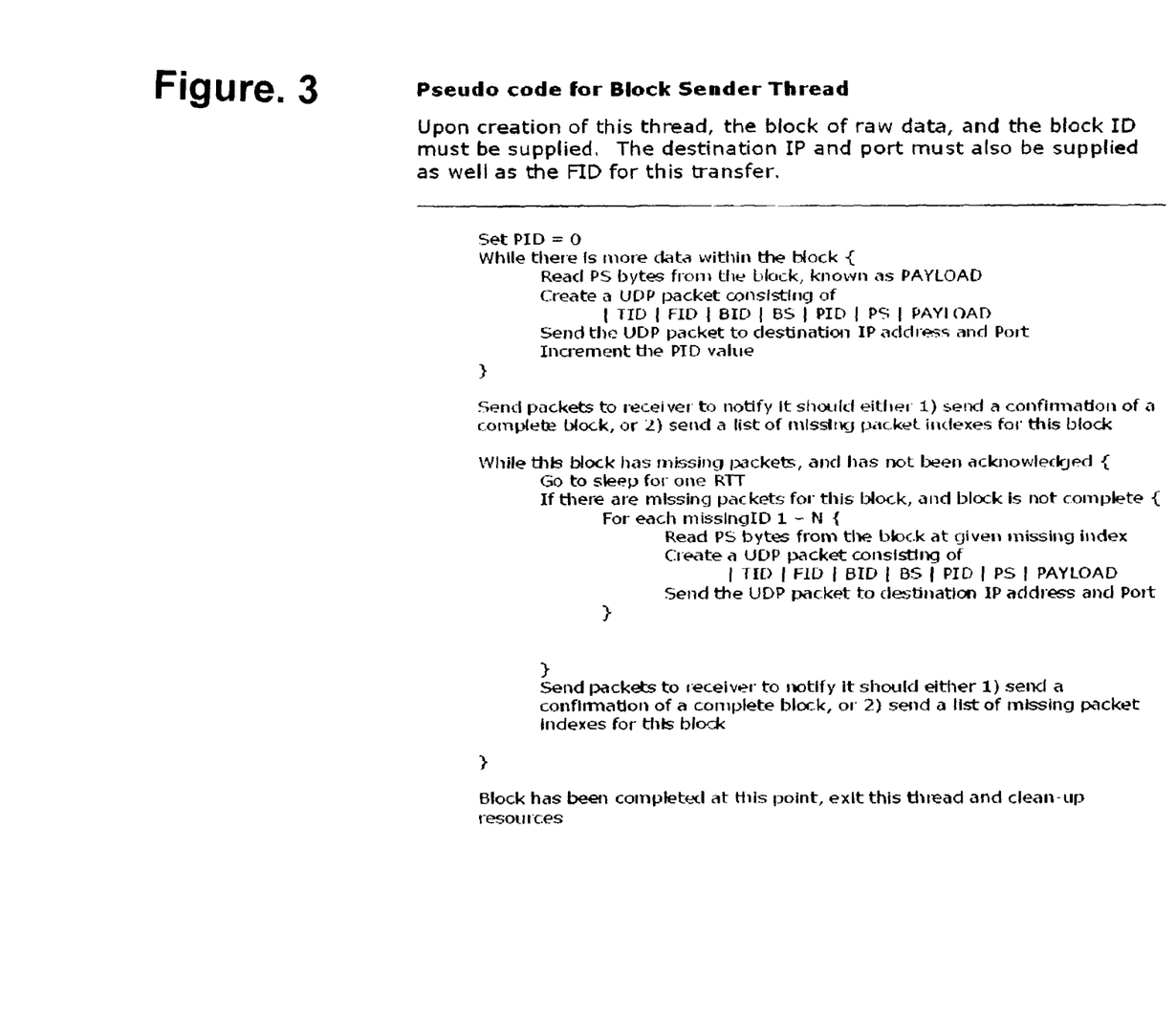
FIG. 3 is sample pseudo-code for the Block Sender Thread of one embodiment of the present invention.

FIG. 3 provides sample pseudo-code for an embodiment of the Block Sender Thread of the present invention, in which pseudo code, the following acronyms are utilized:
1 PID: packet identification number;
2 PS: payload size;
3. TID: the type of data packet, which in the preferred embodiment is UDP packet type
4. FID: file identification number, which is unique to the file being transferred
5. BID: block identification number;
6. BS: block size;
7. RTT: round-trip time (i.e. the length of time it takes to send a message to the receiver, and for the receiver's reply to be received by the sender);

The aforementioned Block Sender Thread pseudo-code is reproduced in italics below:

```
"Upon creation of this thread, the block of raw data, and the block ID
must be supplied. The destination IP and port must also be supplied as
well as the FID for this transfer.
    Set PID = 0
    While there is more data within the block {
        Read PS bytes from the block, known as PAYLOAD
        Create a UDP packet consisting of
            | TID | FID | BID | BS | PID | PS | PAYLOAD
        Send the UDP packet to destination IP address and Port
        Increment the PID value
    }
    Send packets to receiver to notify it should either 1) send a
        confirmation of a complete block, or 2) send a list of missing packet
        indexes for this block
    While this block has missing packets, and has not been
    acknowledged {
        Go to sleep for one RTT
        If there are missing packets for this block, and block is not
        complete {
            For each missingID 1 - N {
                Read PS bytes from the block at given missing index
                Create a UDP packet consisting of
                    | TID | FID | BID | BS | PID | PS | PAYLOAD
                Send the UDP packet to destination IP address and
                Port
            }
        }
        Send packets to receiver to notify it should either 1) send a
            confirmation of a complete block, or 2) send a list of missing
            packet indexes for this block
    }
    Block has been completed at this point, exit this thread and clean-up
    resources"
```

The File Receiver Application

As previously referenced, the File Receiver Application receives and sorts incoming data from the network or Internet and writes it to a receiver device's disk or other accessible data storage device at the destination or to a standard output stream.

In the preferred embodiment of the present invention, upon receipt of incoming UDP packets from the network or Internet, utilizing information provided within the header of each packet, the File Receiver Application, utilizing the Receiver Thread referred to herein, sorts the incoming packets into pre-allocated temporary memory space allocated by the File Receiver Application for each block of data (new temporary memory space being allocated by the File Receiver Application upon receipt of any packets for a block that has not yet been previously identified by the File Receiver Application). That is, for each packet received by the File Receiver Application, the File Receiver Application reads the data from the packet header, and if the block ID is in respect of a block for which other packets have already been received, the packet's payload of data will be transferred to the pre-allocated temporary memory space for that block by the File Receiver Application, and within that pre-allocated temporary memory space, the packet payload data will be stored, in accordance with the packet's packet id and payload size, at the appropriate byte offset.

When the File Transmitter Application has completed the transmission of a full block of data, it transmits notification of this across the network or Internet, to the File Receiver Application. Upon receipt of such notification, the File Receiver Application identifies, as more fully described herein, with respect to that block any missing packets in respect of that block. In the event that the File Receiver Application determines that all packets of that block have been received, the File Receiver Application transmits to the File Transmitter Application an acknowledgment that the block is complete. In the event that the File Receiver Application determines (in a manner more fully described below) that one or more packets of that block have not been received, the File Receiver Application transmits to the File Transmitter Application, a list of any missing packets, whereupon the File Transfer Application retransmits the listed packets. This process of identifying any missing packets and retransmitting to the receiving device of any such packets is repeated until all the packets have been received by the receiving device for all of the blocks.

When all packets for a given block of data have been received by the File Receiver Application and stored in the allocated temporary memory associated with the receiving device, that block of data is transferred from the allocated temporary memory to the destination on the receiving device, or to a standard output stream, and the temporary memory previously allocated for that block, is released for reuse.

Figure 4:
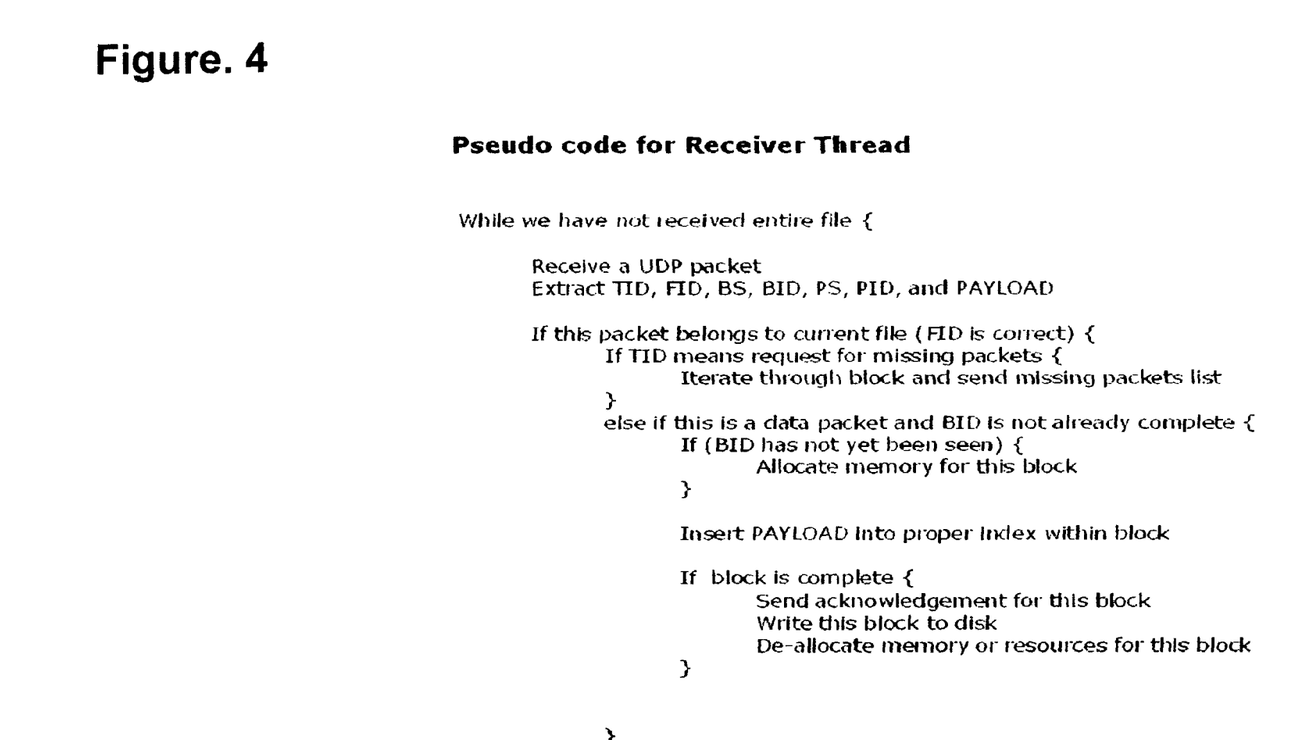
FIG. 4 is sample pseudo-code for the Receiver Thread of one embodiment of the present invention.

FIG. 4 provides sample pseudo-code for an embodiment of the Receiver Thread utilized by the File Receiver Application of the present invention, in which pseudo code, the following acronyms are utilized:
1 PID: packet identification number;
2 PS: payload size;
3 TID: the type of data packet, which in the preferred embodiment is UDP packet type
4 FID: file identification number, which is unique to the file being transferred
5 BID: block identification number;
6 BS: block size;

The aforementioned Receiver Thread pseudo-code is reproduced in italics below:

```
"While we have not received entire file {
    Receive a UDP packet
    Extract TID, FID, BS, BID, PS, PID, and PAYLOAD
    If this packet belongs to current file (FID is correct) {
        If TID means request for missing packets {
            Iterate through block and send missing packets list
        }
        else if this is a data packet and BID is not already complete {
            If (BID has not yet been seen) {
                Allocate memory for this block
            }
            Insert PAYLOAD into proper index within block
            If block is complete {
                Send acknowledgement for this block
                Write this block to disk
                De-allocate memory or resources for this block
            }
        }
    }
}"
```

Detecting Missing Packets from a Block

As referenced earlier, the File Receiver Application detects any missing packets from any transmitted block. In a preferred embodiment of the present invention, for each block that is received, in whole or in part, an integer variable associated with that block which will be referred to herein as the packet received counter RECEIVEDCOUNT is initialized as "0" and a Boolean (true/false) array is maintained with an index for each packet in the block, and with the array values initialized as "false". The size of the array (corresponding to the number of packets) is calculated by dividing the payload size into the block size (and in the event that such a calculation results in a remainder, the size of the array is increased by 1, corresponding to a packet that contains a payload which is less than the payload size).

As a packet is received by the File Receiver Application, the File Receiver Application checks to determine whether or not that packet has been previously received, and if not previously received, the File Receiver Application will set the previously "false" Boolean Array entry corresponding to that packet to "true" and will increase by "1" the packet received counter RECEIVEDCOUNT associated with that block. In this manner, at any given time it is easy to determine the number of packets that are missing in respect of a particular block (calculated as follows):

Number of missing packets="array size"−RECEIVEDCOUNT

Additionally, in respect of a transmitted block, to generate a list of the packets missing from the block at the receiver device, the array in respect of the block is queried for those indexes that remain false, which query results may be transmitted to the File Transmitter Application as described above.

Transmission/Congestion Control

As indicated above, in one embodiment of the present invention, the UDP protocol is utilized, which protocol has no built-in flow or congestion control, which may result in the network being flooded with too many packets being transmitted at any particular time. Furthermore, it is generally desirable to permit multiple data transmissions on the same network, and therefore desirable to permit the transmission of the data in accordance with the present invention to coexist with other data transmissions on the same network.

To detect network congestion, and to moderate data transmission in response thereto, in one embodiment of the present invention, at regular intervals, for example at intervals of 200 ms (which intervals may be varied to permit faster or slower reaction to any congestion), the File Transmitter Application on the sender device sends a packet of data from the sender device to the receiver device, and the File Receiver Application on the receiver device immediately responds with a reply to the File Transmitter Application on the sender device. This overall operation is timed and provides a current RTT duration value for the network between the sender and receiver. This duration value (hereinafter the "RTT duration value", and the time and date at which this data was obtained (the "corresponding Time Stamp data") are then used to provide a method of continuously updating transmission control on the network or Internet.

In one embodiment of the present invention, an array of five pairs of variables is established (hereinafter the "array", it being understood that fewer or greater numbers of pairs can be utilized in alternative embodiments of the present invention) the value of one variable in each pair being used to store data relating to RTT duration values, and being established and maintained in accordance with the process set out below, and the other variable in each pair being used to store the Time Stamp data corresponding to that value. In this embodiment, the values of such variables are maintained and updated in the following way:

1. Initially the five RTT duration variables within the array are assigned the values of the first five RTTs calculated by the File Receiver Application;
2. An average of these initial first five duration values is calculated, and a variable "Average Low RTT" is temporarily assigned this calculated average.
3. An initial threshold value is established. In one embodiment of the present invention, the initial threshold value is within the range of 10 and N (as more fully described herein) and is established using the following formula:

Threshold=(int) (Math.min (get Average Low RTT ( )*5, N)) (that is, as a first step, set the threshold value to the lesser of 5 times the average low RTT, or N);

Threshold=(int) (Math.max (threshold, 10)) (that is, as a second step, take as the new threshold the larger of the previously calculated threshold and 10)

In order to increase or decrease the algorithms sensitivity to changes in RTT, the value of N can be adjusted accordingly. To increase its sensitivity, that is, to make it slow down quicker in the face of congestion, one would maintain a lower value for N, for example 100. This would allow for less congestion to cause a decrease in speed. To decrease the sensitivity, that is, to make it maintain higher speeds in the face of congestion, one would maintain a higher value of N, for example 500.
4. Thereafter, whenever a new RTT value is obtained/calculated for the network or Internet (the "Current RTT") which is lower than the current highest value in the array and is lower than the combined current value of the variable Average Low RTT plus the threshold, the Current RTT replaces the current highest value in the array and the average of these values is recalculated and the variable "Average Low RTT" is temporarily assigned this newly calculated average;

5. Whenever the Time Stamp data corresponding to any RTT duration variable then being stored in the array is older than a threshold length of time (such as for example, older than 60 seconds or some other amount of time, as would be understood by a person skilled in the art), the RTT duration value associated therewith is removed from the array, unless this would result in an empty array, in which case, it will continue to be maintained in the array for the time being.

When each new RTT is calculated/obtained by the File Transmitter Application, it is then compared to the current Average Low RTT. If the value of the newly calculated/obtained RTT is greater than the combined current Average Low RTT plus the threshold, the transmission rate is slowed down by the File Transmitter Application. If not, the rate of transmission is increased by the File Transmitter Application.

In one embodiment of the present invention, the transmission rate is increased or decreased in the following manner:

Throughout the transmission, the number of successive transmission speed increases and decreases is tracked. When the transmission commences, the rate of transmission may be incrementally altered, whenever a new RTT value is received. During the initial phase of the transfer (herein referred to as the "START" phase) the rate of transmission is increased more rapidly than the remainder of the transfer (herein referred to as the "NORMAL" phase). During the START phase, the rate of transmission may be increased by the following amount (if in accordance with the above-referenced calculation, an increase is to be effected, calculate the number of immediately consecutive increases in the rate of transmission that have occurred, and take that number to the exponent 1.5 and increase the transmission rate by this calculated amount. Once five consecutive slowdowns have occurred, the transmission rate will be decreased by the following amount (the last recorded number of consecutive increases to the exponent 1.5). At this time, the START phase has been completed and the NORMAL phase commences in which the increases (and decreases) to the transmission rate will be calculated as follows: Previously defined parameters are provided, PAR1 (an amount greater than 1, this value being the upper limit of size of minor changes to the transmission rate), PAR2 (the number of times that the transmission rate must consecutively increase or decrease before a non-minor change to the transmission rate) and PAR3 (in the case of non-minor changes in the transmission rate, this number is divided into the current transmission rate), it being understood that PAR1, PAR2 and PAR3 can be modified or adjusted as needed to provide a slower or faster rate of increase or decrease as desired. When the number of consecutive increases or decreases is less than PAR2, the increase or decrease in the rate of transmission by an amount equal to the calculated remainder of dividing (on a whole integer arithmetic basis) the most recent number of consecutive increases or decreases by PAR1 (so for example, if PAR1 is set at "3", and "2" consecutive increases have just occurred, the calculation of 2 divided by 3 provides a remainder of 3). When the number of consecutive increases or decreases is greater than PAR2, the transmission rate will be increased (or decreased) by the calculated amount (current transmission rate divided by PAR3) so that there will be larger increases and decreases in the transmission rate when the current transmission rate is higher, while there will be smaller increases and decreases in the transmission rate when the current transmission rate is lower.

The present invention may be utilized in networks and the Internet including high-bandwidth networks that suffer latency or packet loss, including, for example, wide-area networks, satellite and wireless communications, and is ideally suited for use by media and content providers, government and military organizations, and those entities with the need for large data transfer across long distances, and where packet loss is expected. Additionally, the present invention may be utilized for point to point deployment, for spoke deployment, for mesh deployment and to multicast to multiple clients simultaneously so that all files are transferred at the maximum linespeed available for each client. Additionally, the present invention may be combined with data compression and/or encryption algorithms and methodologies in a manner known to a person skilled in the art to provide increased performance and/or functionality to the data transfer process.

The present invention has been described herein with regard to preferred embodiments. However, it will be obvious to persons skilled in the art that a number of variations and modifications can be made without departing from the scope of the invention as described herein.

What is claimed:

1. A method for transmitting data from a first device on a network to a second device on the network comprising:
   a. providing a File Transmitter Application in communication with the first device, which File Transmitter Application is adapted to control the transmission of the data on the network by dividing the data to be transmitted in two levels with the data being divided into data blocks in a first level and each data block being then divided into a plurality of User Datagram Protocol data packets in a second level, including the timing of the commencement of the transmission of the data blocks on the network;
   b. providing a File Receiver Application in communication with the second device and in communication with the File Transmitter Application, which File Receiver Application is adapted to transmit Acknowledgment data to the File Transmitter Application relating to the receipt of data blocks received at the second device;
   c. commencing the transmission of a first data block from the first device to the second device, by way of the network;
   d. commencing the transmission of the second data block from the first device to the second device, by way of the network;
   wherein the transmission of the data blocks commences in a consecutive fashion and wherein the File Transmitter Application is adapted to permit the commencement of the transmission of the second data block independently of the receipt by the File Transmitter Application of Acknowledgment data relating to the receipt of the first data block at the second device and wherein the File Receiver Application is adapted to transmit to the File Transmitter Application data relating to one of an acknowledgement that the first data block has been completely received and a list of missing data packets of the first data block and wherein the File Transmitter Application is adapted to receive such data and is adapted to resend any data packets not received at the second device and wherein the transmission of the data blocks proceeds prior to and independently of the checking for missing data packets and completion of the transmission of any missing packets associated with the data blocks.

2. A method according to claim 1, wherein the File Transmitter Application is adapted to commence the transmission of the second data block immediately upon the completion of the transmission of the first data block.

3. A method according to claim 1, wherein the File Transmitter Application is adapted to commence the transmission of the second data block immediately upon the expiration of a period of time after the commencement of the transmission of the first data block.

4. A method according to claim 1, wherein the File Transmitter Application is also adapted to receive information relating to the maximum volume of data that may be transmitted over the network at a point in time and is adapted to and utilizes this information to modify the maximum data block size to be subsequently transmitted over the network and the maximum number of blocks to be in transmission at a subsequent point in time.

5. A method according to claim 1, wherein the File Transmitter Application is also adapted to, and sends a first timing data packet between the first device and the second device, and wherein the File Receiver Application is adapted to, and receives the first timing data packet from the File Transmitter Application, and thereafter sends a second timing data packet between the second device and the first device, which the File Transmitter Application is also adapted to, and receives, and thereafter calculates a first Reasonable Round Trip time number relating to the duration of time between the sending of the first timing packet by the File Transmitter Application and the receipt of the second timing packet by the File Transmitter Application, the File Transmitter Application using the calculated first Reasonable Round Trip time to modify the maximum data block size to be subsequently transmitted and the maximum number of blocks to be in transmission at a subsequent point in time.

6. A method according to claim 1, wherein the File Transmitter Application is also adapted to, and sends a third timing data packet between the first device and the second device, and wherein the File Receiver Application is adapted to, and receives the third timing data packet from the File Transmitter Application, and thereafter sends a fourth timing data packet between the second device and the first device, which the File Transmitter Application is also adapted to, and receives, and thereafter calculates a second Reasonable Round Trip time number relating to the duration of time between the sending of the third timing packet by the File Transmitter Application and the receipt of the fourth timing packet by the File Transmitter Application, the File Transmitter Application using the calculated second Reasonable Round Trip time to modify the maximum data block size to be subsequently transmitted and the maximum number of blocks to be in transmission at a subsequent point in time.

7. A method according to claim 1, wherein the File Transmitter Application is also adapted to, and, using the previously calculated Reasonable Round Trip times to calculate an Average Reasonable Round Trip time, the File Transmitter Application using the calculated Average Reasonable Round Trip time to modify the maximum data block size to be subsequently transmitted and the maximum number of blocks to be in transmission at a subsequent point in time.

8. A method according to claim 1, wherein the File Transmitter Application is adapted to send a notification to the File Receiver Application upon completion of the transmission of the first data block, the notification being indicative of the completion of the transmission of the first data block.

* * * * *